(12) United States Patent
Williams

(10) Patent No.: US 7,886,849 B2
(45) Date of Patent: Feb. 15, 2011

(54) SYSTEM FOR DRILLING UNDER-BALANCED WELLS

(76) Inventor: Danny T. Williams, 1210 Seabury Ct., Katy, TX (US) 77494

( * ) Notice: Subject to any disclaimer, the term of this patent is extended or adjusted under 35 U.S.C. 154(b) by 358 days.

(21) Appl. No.: 12/069,458

(22) Filed: Feb. 11, 2008

(65) Prior Publication Data
US 2009/0200085 A1 Aug. 13, 2009

(51) Int. Cl.
*C09K 8/02* (2006.01)
*E21B 34/06* (2006.01)

(52) U.S. Cl. .................. 175/69; 175/205; 166/332.1

(58) Field of Classification Search ............. 175/62, 175/69, 205, 57, 207, 25; 166/386, 332.1
See application file for complete search history.

(56) References Cited

U.S. PATENT DOCUMENTS

| 3,497,020 | A | * | 2/1970 | Kammerer, Jr | 175/69 |
|---|---|---|---|---|---|
| 3,799,260 | A | * | 3/1974 | Barrington | 166/185 |
| 4,330,039 | A | | 5/1982 | Vann et al. | |
| 4,603,741 | A | * | 8/1986 | Edgmon | 166/369 |
| 4,846,272 | A | | 7/1989 | Leggett | |
| 5,720,356 | A | | 2/1998 | Gardes | |
| 6,065,550 | A | | 5/2000 | Gardes | |
| 6,457,540 | B2 | | 10/2002 | Gardes | |
| 6,745,855 | B2 | | 6/2004 | Gardes | |
| 6,923,275 | B2 | | 8/2005 | Gardes | |
| 7,185,718 | B2 | | 3/2007 | Gardes | |
| 7,243,738 | B2 | | 7/2007 | Gardes | |
| 2002/0117309 | A1 | | 8/2002 | Guillory et al. | |
| 2004/0216868 | A1 | | 11/2004 | Owen, Sr. | |
| 2006/0000619 | A1 | | 1/2006 | Borst et al. | |
| 2007/0095540 | A1 | | 5/2007 | Kozicz et al. | |

OTHER PUBLICATIONS

Robert R. Teichrob, "Low-Pressure Reservoir Drilled with Air/N2 in a Closed System", Oil & Gas Journal, Mar. 1994.
Eide et al., "Further Advances in Coiled-Tubing Drilling", Journal of Petroleum Technology, May 1995.
Rommetveit et al., "A Dynamic Model for Underbalanced Drilling with Coiled Tubing", SPE/IADC 29363, Mar. 1995.
Falk et al., "An Overview of Underbalanced Drilling Applications in Canada", SPE 30129, May 1995.

* cited by examiner

*Primary Examiner*—William P Neuder
*Assistant Examiner*—Elizabeth C Gottlieb
(74) *Attorney, Agent, or Firm*—Jones Walker

(57) ABSTRACT

A system and method for drilling a well bore with an under-balanced hydrostatic pressure. The system used in the method includes a tubular member containing a first port, a compression member disposed about the outer portion of the tubular member and having an internal sliding mandrel extending therefrom with a second port, an external sliding sleeve having a third port and being in contact with the internal sliding mandrel and operatively associated with the internal sliding mandrel, and a compressible seal disposed about the external sliding mandrel that is responsive to a longitudinal weight transferred to the compression member. In a closed position the first, second and third port are misaligned and in an open position the first, second and third ports are aligned.

4 Claims, 3 Drawing Sheets

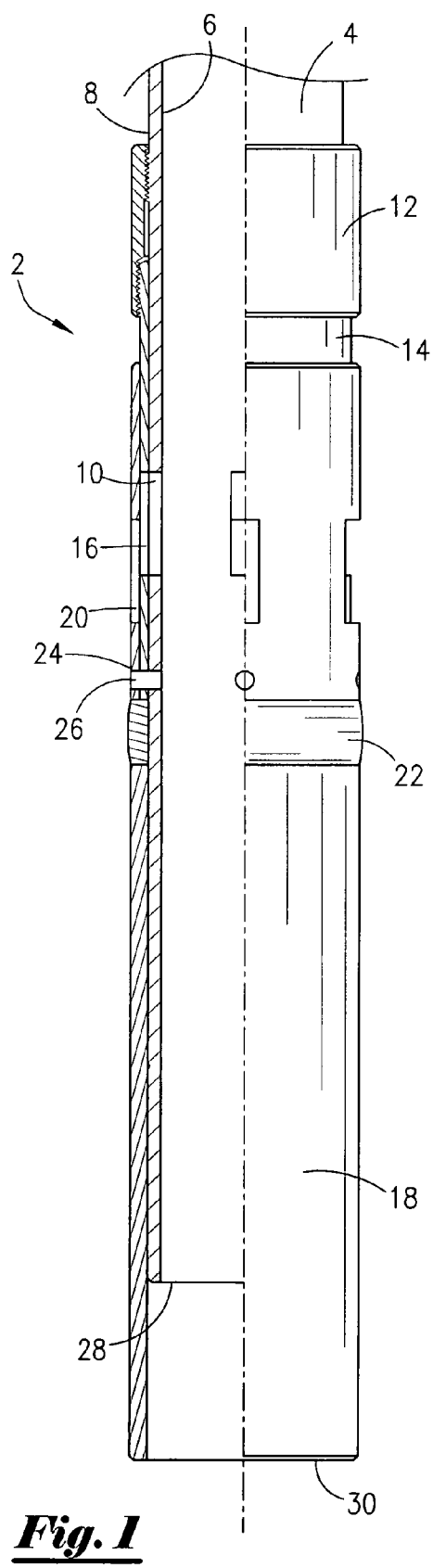 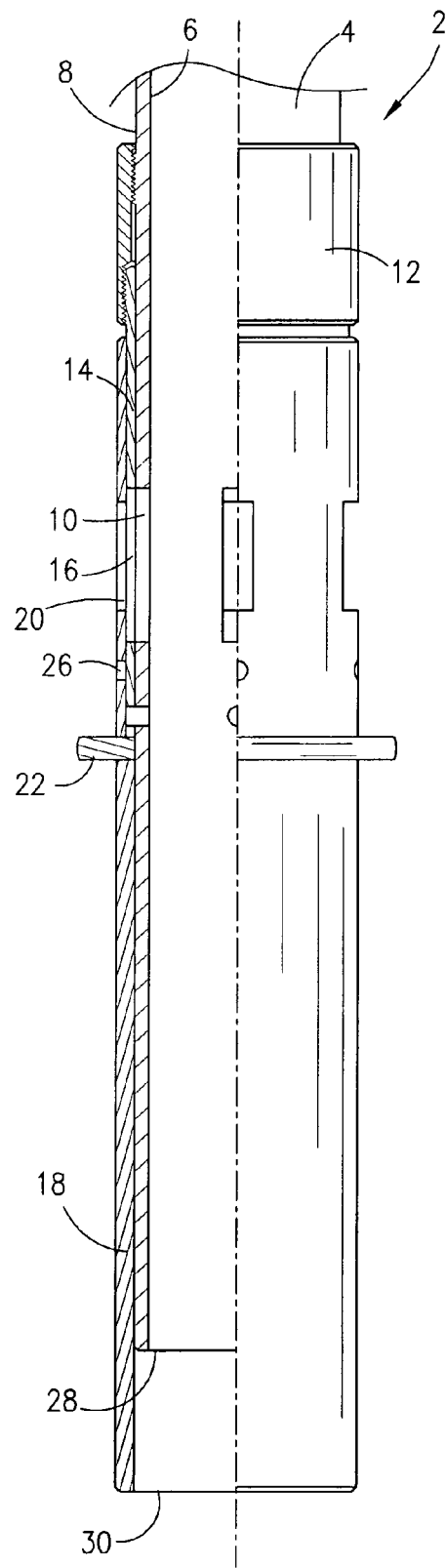
*Fig. 1*  *Fig. 2*

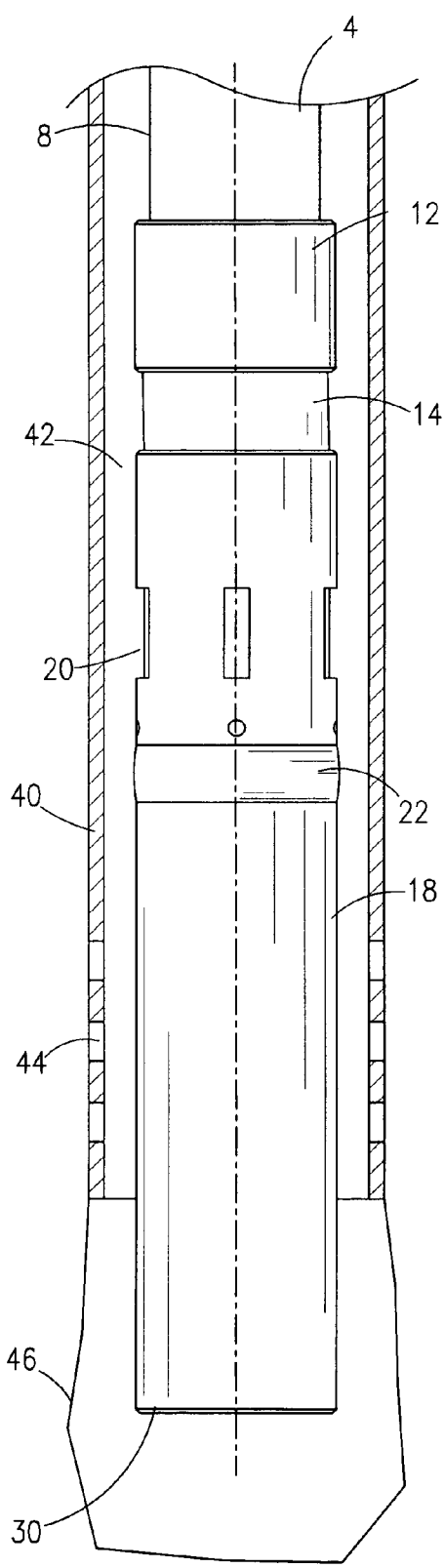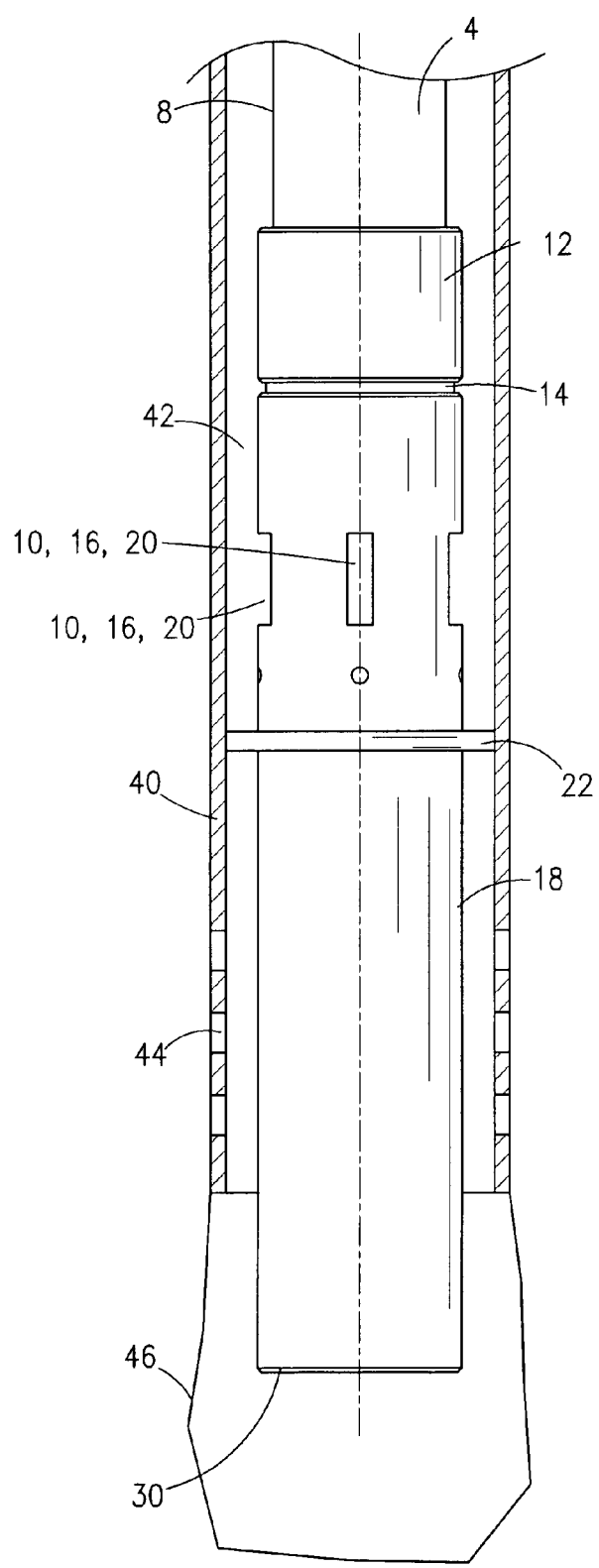
*Fig. 3*  *Fig. 4*

SYSTEM FOR DRILLING UNDER-BALANCED WELLS

BACKGROUND OF THE INVENTION

This invention relates to a system for drilling under-balanced wells. More specifically, but not by way of limitation, this invention relates to an apparatus and method for drilling wells with an under-balanced hydrostatic head of pressure.

In the search for hydrocarbons, a well is drilled to a subterranean reservoir containing hydrocarbons. As those of ordinary skill in the art appreciate, drilling fluids are placed into the well in order to control reservoir pressure. Uncontrolled pressure releases from subterranean reservoirs can lead to blow-outs, which in turn can lead to severe personal injury and property damage.

A very well known technique for controlling well pressure is to weight the drilling fluid. Hence, the weighted drilling fluid creates a sufficient pressure to prevent reservoir pressure from entering the well. However, in the cases where the subterranean reservoir is under pressured, or normally pressured, or in the event that the drilling fluid is over-weighted, the drilling fluid may migrate into the formation. The migration of drilling fluid may cause damage to the formation, and in particular, may cause permeability and skin damage to the formation, which in turn will lead to a loss of productivity and commercial feasibility.

A prior art technique is to drill the well in an under-balanced state. Special equipment, drilling fluids and operating techniques exist so that it is possible to drill with a drilling fluid to achieve a hydrostatic pressure below the formation pore pressure. This may mean that formation fluids and gas flow into the well while drilling.

In one prior art technique, a special tool is added on top of the BOP, called a rotating control head. This seals on the drill pipe while allowing rotation and movement of the drill string. It is necessary to do this so that the actual pressure at the bottom of the hole (drilling fluid hydrostatic pressure plus surface pressure plus formation pressure) can be controlled.

Despite these advances, another prior art technique has been developed which employs concentric tubulars. The concentric strings allow for a gas or air to be injected into a common annulus which in turn allows for safe mixing of gas or air and fluid while still maintaining control of the operation. Nevertheless, problems with slugging and well control are encountered as the drilling string advances and the gas or air is injected all the way down the conveying conduit and back up the bottom of the concentric casing string into the concentric casing return annulus. Some of the disadvantages of these prior art systems include exerting the injecting gas, air or fluid injection pressure on the open formation which causes slugging, formation damage and well bore stability problems. Also, the prior art systems are unable to regulate the amount of gas, air or fluid that is mixed with the return drilling fluid which causes slugging and hole cleaning issues of piled-up drill cuttings in the well bore. Therefore, there is a need for an apparatus and method for drilling under-balanced wells that can address these and other issues.

SUMMARY OF THE INVENTION

In one preferred embodiment, a flow apparatus for controlling pressure within a well during under-balanced drilling is disclosed. The apparatus comprises a tubular member having an inner portion and an outer portion and containing a first injection port, and a compression member disposed about the outer portion of the tubular member, with the compression member having extending therefrom an internal sliding mandrel, and wherein the internal sliding mandrel contains a second injection port. The apparatus further comprises an external sliding sleeve operatively associated with the internal sliding mandrel, wherein the external sliding sleeve containing a third injection port; and wherein in a closed position the first, second and third port are misaligned and in an open position the first, second, and third port are aligned. The apparatus also comprises a compressible seal disposed about the external sliding sleeve and in contact with the internal sliding mandrel, the compressible seal responsive to a weight applied to the tubular member which is transferred to the compression member for longitudinal movement.

In this embodiment, the apparatus also contains means for actuating longitudinal movement of the compression member, and wherein the actuating means may include a shear pin configured to shear once a predetermined weight is applied to the compression member. It should be noted that in another embodiment, a compression spring is used to allow weight to be applied and actuate the external seal and alignment of the injection ports. The apparatus may further comprise a drill string positioned within the inner portion of the concentric tubular member, the drill string having a drill bit attached at one end, and wherein a drill string annulus is formed relative to the drill string and the concentric tubular member. Additionally, a tubular annulus is formed between the well and the concentric tubular member either open hole or cased hole. The concentric tubular member may contain left hand threads so that the tubular member will not back off while rotating the drill string and the bit during drilling. The compressible seal, in one preferred embodiment, is an elastomeric member sealing mechanism. In one embodiment, the compressible seal is selected from the group consisting of an elastomeric member, plastic or steel. In the most preferred embodiment, a drilling fluid is placed within the drill string annulus and gas is placed within the concentric tubular annulus.

A method of drilling a well within a well bore with an under-balanced hydrostatic head of pressure is also disclosed. The well bore contains a casing string therein. The method comprises running into the well bore with a flow apparatus, the flow apparatus comprising: a tubular concentrically placed within the casing string, with the tubular having a first injection port; a compression member disposed about an outer portion of the tubular member, with the compression member having extending therefrom an internal sliding mandrel, and wherein the internal sliding mandrel contains a second injection port; an external sliding sleeve operatively associated with the internal sliding mandrel, wherein the external sliding sleeve containing a third injection port; wherein in a closed position the first, second and third port are misaligned while in a disengaged position, and in an open position the first, second, and third port are aligned while in the engaged position; a compressible seal disposed about the external sliding sleeve and in contact with the internal sliding mandrel, with the seal responsive to longitudinal setting of weight on the compression member and making contact with the well bore's casing string to make a seal between the inside of the well bore casing string and the outside of the concentric tubular member.

Next, the method includes setting down weight on the concentric tubular, transferring the weight to the external sliding sleeve, moving the compression member relative to the external sliding sleeve, and aligning the first, second, and third port so that an injection passage is formed from the concentric tubular member to the tubular annulus. The method further includes expanding the seal within the tubular annulus. The method includes lowering a drill string within an inner portion of the tubular, the drill string having a bit attached at a distal end, forming a tubular annulus between the tubular member and the drill string, and forming a well bore annulus between the well and the tubular member. The method further includes pumping a gas down the well bore annulus, and directing the gas through the passage ports and into the tubular annulus. The method further comprises pumping fluid down an inner portion of the drill string, mixing the fluid and the gas within the tubular annulus, drilling the well with the bit, and lightening the hydrostatic head of pressure at the bit with the gas and fluid mixture within the tubular annulus. Also, in one preferred embodiment, the gas pumped down the well bore annulus is nitrogen, air or natural gas.

In one preferred embodiment, the step of expanding the compressible seal includes setting down weight on the tubular so that the internal sliding mandrel acts against the compressible seal. Additionally, the step of expanding the seal member includes engaging the well bore with the compressible seal so that the gas being pumped down the tubular annulus is directed through the aligned ports.

In yet another embodiment, a system for drilling wells within a well bore with an under-balanced hydrostatic pressure is disclosed. In this embodiment, the system comprises a concentric tubular member having an inner portion and an outer portion and containing a first injection port and wherein a well bore annulus is formed between the well bore and said tubular member. The system further comprises a compression member disposed about the outer portion of the concentric tubular member, with the compression member having extending therefrom an internal sliding mandrel, and wherein the internal sliding mandrel contains a second injection port. The system further includes an external sliding sleeve operatively associated with the internal sliding mandrel, wherein the external sliding sleeve contains a third injection port, and wherein in a closed position the first port, the second port and the third port are misaligned and in an open position the first port, the second port and the third port are aligned. The system further comprises a compressible seal disposed about the external sliding sleeve and in contact with the internal sliding mandrel, with the compressible seal being responsive to a longitudinal weight transferred to the compression member, and a work string positioned within the inner portion of the concentric tubular member, with the work string having a drill bit attached at a distal end of the work string, and wherein a work string annulus is formed relative to the concentric tubular member and the work string. In one embodiment, the work string includes a coiled tubing string and the well bore includes a horizontal section.

In yet another preferred embodiment, a method of drilling a well within a well bore with an under-balanced hydrostatic head of pressure is disclosed. In this embodiment, the well bore contains a casing string, and the method comprises running into the well bore with a flow apparatus, with the flow apparatus including a tubular concentrically placed within the casing string. The method further comprises forming a passage from an outer portion of the flow apparatus to an inner portion of the tubular, expanding a seal member located on the flow apparatus within the well bore annulus, and lowering a drill string within the inner portion of the tubular, with the drill string having a bit attached at a distal end. The method further includes forming a tubular annulus between the inner portion of the tubular and the drill string, forming a well bore annulus between the well and the tubular and pumping a gas down the well bore annulus. The method further comprises directing the gas through the passage and into the tubular annulus, pumping fluid down an inner portion of the drill string and mixing the fluid and the gas within the tubular annulus. The method further includes drilling the well with the bit and lightening the hydrostatic head of pressure at the bit with the gas and fluid mixture within the tubular annulus. In this embodiment, the gas pumped down the well bore annulus is nitrogen. Also, the step of expanding the seal member includes engaging the well bore with the seal member by way of the force of the gas being pumped so that the gas being pumped down the tubular annulus is forced through the aligned ports because the seal is engaged.

An advantage of the present invention includes the ability to selectively open and close the injection ports. Another advantage is the injection ports help in mixing the gas and fluids used in the process. Still yet another advantage is the seal engages with the well bore and provides a passage for the injection mediums. Yet another advantage is that the seal isolates the concentric tubular annulus from the well bore annulus. Another advantage is that the system allows for creating a seal, via a seal member, with the well bore, and wherein the seal is below the injection ports during under-balanced operations.

A feature of the present invention is that once the assembly is on bottom, sufficient weight is placed on the concentric tubular to engage the sliding sleeve and in turn the compressible seal so that the injection ports are lined-up and open. The compressible seal extends radially outward to make the seal. Another feature is that the apparatus can be run in vertical, directional and/or horizontal wells. The apparatus can also be run in cased hole or open hole section to drill under-balanced while maintaining a seal below the injection ports but above the bottom of the concentric tubular member.

Another feature of the present disclosure is a sealing mechanism in cased hole that does not allow the injecting gas, air or fluid injection pressure affect the open hole and eliminates slugging, formation damage and well bore stability issues. Another feature is a slotted entry port to regulate the amount of injection gas, air or fluid that is mixed with the return drilling fluid to eliminate slugging and hole cleaning issues at the cased hole to open hole well bore section.

Yet another feature is that the concentric casing left hand thread will not allow a back-off of the concentric casing while rotating the internal drill string to the right to drill the well bore ahead of the concentric casing, and wherein prior art concentric casing do not have this advantage, they must be anchored on bottom and top so they will not back-off during the drilling process. Another feature is the step of expanding the seal member includes engaging the well bore with the seal member by way of the force of the gas being pumped so that the gas being pumped down the annular area is forced through the aligned ports because the seal is engaged.

BRIEF DESCRIPTION OF THE DRAWINGS

FIG. 1 is a partial cross-sectional view of the most preferred embodiment of the present apparatus with injection ports closed and seal contracted.

FIG. 2 is a partial cross-sectional view of the apparatus seen in FIG. 1 with the ports open and the seal compressed and extended.

FIG. 3 is a schematic illustrating the apparatus with injection ports closed and seal contracted within a well bore.

FIG. 4 is a sequential illustration of the apparatus seen in FIG. 3 within a well bore, wherein the injection ports are open and the seal is compressed and extended.

DETAILED DESCRIPTION OF THE PREFERRED EMBODIMENTS

Figure 5:
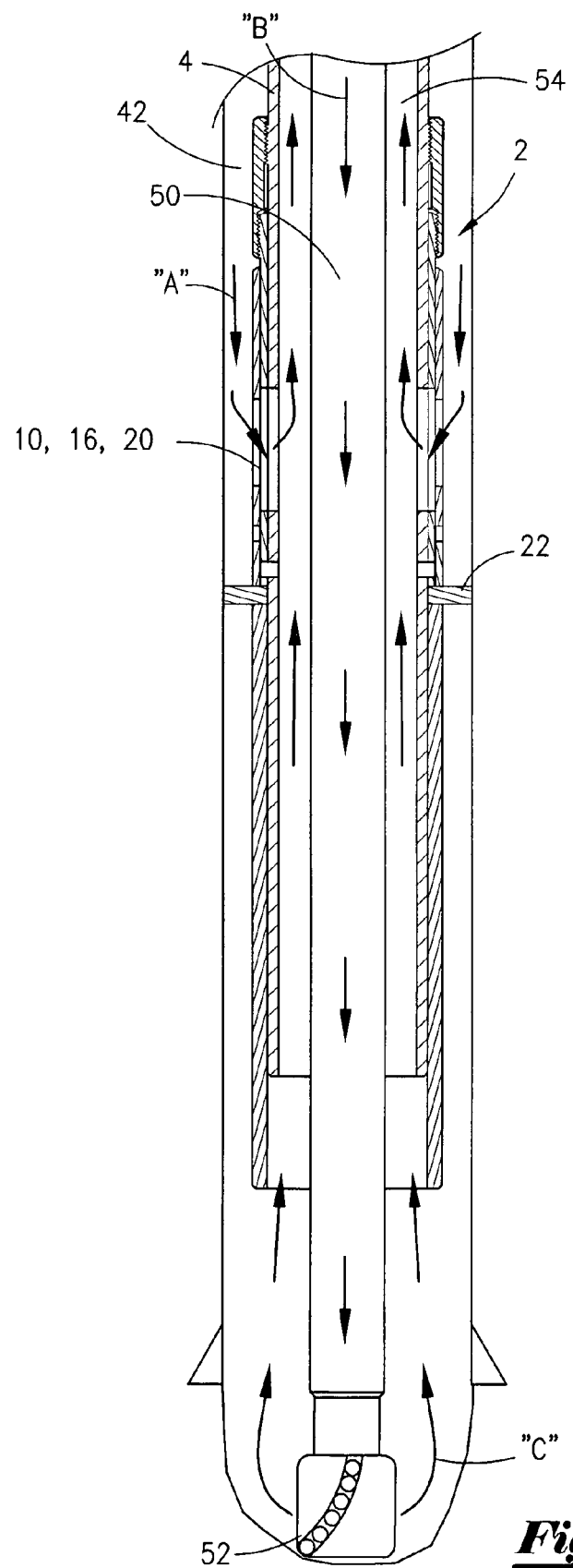
FIG. 5 is a schematic illustration of the apparatus seen in FIG. 4 depicting the flow of the fluids and gas.

Referring now to FIG. 1, a partial cross-sectional view of the most preferred embodiment of the present apparatus 2 with injection ports closed and seal contracted. More specifically, the apparatus 2 includes the tubular member 4, with the tubular member 4 having an inner portion 6 and an outer portion 8, as well as an injection port 10. The injection port 10 provides for a passage through the tubular 4. FIG. 1 also depicts the compression member 12, which is an external nut, and wherein the compression member 12 is disposed about the tubular 4. In the most preferred embodiment, the compression member 12 screws onto the outside of the tubular 4. An internal sliding mandrel 14 is connected to the compression member 12, and wherein the internal sliding mandrel 14 extends from the compression member 12. The internal sliding mandrel 14 will also contain an injection port 16, wherein the injection port 16 allows for a passage through the internal sliding mandrel 14.

FIG. 1 also depicts the external sliding sleeve 18 that is operatively associated with the internal sliding mandrel 14. The external sliding sleeve 18 also contains a third injection port 20, with the third injection port 20 forming an opening within the external sliding sleeve 18 for the passage of fluid and/or gas, as will be more fully explained later in the application. A compressible seal 22 is disposed about the external sliding sleeve 18, with the compressible seal 22 being in contact with the internal sliding mandrel 14. The compressible seal 22 is commercially available from Rubber Atkins under the name Packing Elements and Seals. The compressible seal 22 is responsive to weight applied to the external sliding sleeve 18, for instance when the tubular member 4 is set-down on the well bore bottom thereby setting-down weight on the external sliding sleeve 18. The compressible seal 22 contracts to create a seal below the injection ports 10, 16, 20 and above the bottom of the external sliding sleeve 18.

A means for actuating longitudinal movement of the compression member 12 is generally seen at 24. In the most preferred embodiment, the actuating means comprises a shear pin 26 configured to shear once a predetermined weight is applied to the compression member 12 as previously described. FIG. 1 also illustrates the distal end 28 of the tubular member 4 as well as the distal end 30 of the external sliding sleeve 18.

Referring now to FIG. 2, a partial cross-sectional view of the apparatus 2 seen in FIG. 1 with the injection ports 10, 16, 20 open and the seal 22 compressed and extended will now be described. It should be noted that like numbers appearing in the various figures refer to like components. In this view, the distal end 30 of the external sliding sleeve 18 has been forced upward relative to the tubular member 4, for instance by the application of weight, so that the shear pin 26 has sheared. Once sheared, the internal sliding mandrel 14 is configured to compress the seal 22, which in turn expands the seal 22 as seen in FIG. 2. Also, as per the teachings of the present disclosure, the ports 10, 16 and 20 are now aligned so that a passage is formed for liquids, fluids and gas i.e. liquids, fluids and gas may pass from the outer portion of the apparatus 2 to the inner portion 6 of the apparatus 2.

FIG. 3 is a schematic illustrating the apparatus 2 with injection ports 10, 16 and 20 closed and the compressible seal 22 contracted within a well bore 40. The apparatus 2 will be placed into the well bore 40 in the disengaged mode, as seen in FIG. 1. The injection ports 10, 16 and 20 are not aligned, and therefore, closed. This position allows the operator to circulate through the bottom (distal end 28) of the concentric tubular member 4. The distal end 28 is seen in FIG. 1. Referring again to FIG. 3, a tubular annulus 42 is formed between the well bore 40 and the tubular member 4, and this tubular annulus 42 can be used for circulating with drilling fluid. It should be noted that FIG. 3 depicts the well bore 40 as having a cased hole portion 44 as well as an open hole section 46. The apparatus 2 can be run in the vertical, directional and horizontal inclinations in either a cased hole or open hole environment and above, thru and/or below retrievable whipstocks, section milled windows or any prior art system used in the industry to exit cased holes or open holes.

Referring now to FIG. 4, a sequential illustration of the apparatus 2 seen in FIG. 3 within the well bore 40 is shown, and wherein the injection ports 10, 16, 20 are open and the seal 22 is compressed and extended. Once on bottom of the open hole section 46, enough weight is placed on the tubular member 4 (generally by slacking-off of the weight of the tubular member 4 within the well bore 40), the seal 22 is compressed and radially extended (as seen in FIG. 4) to the inner portion of the well bore 40 to make a seal. Hence, the injection ports 10, 16 and 20 are lined-up and opened, and due to the seal made by the seal 22, flow down the tubular annulus 42 is forced through the ports 10, 16, and 20. The seal 22 also isolates flow down the tubular annulus 42 from entering and/or effecting the open hole 46.

FIG. 5 is a schematic illustration of the apparatus 2 seen in FIG. 4 depicting the flow of the fluids and gas during drilling operations. More specifically, the operator has lowered the drill string 50, which may be either a threaded drill pipe or may be coiled tubing. In the preferred embodiment, the drill string 50 is lowered inside the concentric tubular member 4 after the engaging weight is applied to open the injection ports and the concentric tubular member 4 is hung-off at the surface wellhead. The seal 22 has been expanded, and wherein the seal 22 is sealingly engaging the well bore 40. Note that the seal 22 is below the injection ports 10, 16, 20. The drill string 50 has a bit 52 for drilling the bore hole, as well understood by those of ordinary skill in the art. A drill string annulus 54 is formed when the drill string 50 is concentrically placed within the tubular member 4. Hence, the operator would, in the most preferred embodiment, inject a gas, such as air or nitrogen or natural gas, down the tubular annulus 42 (as denoted by the arrow "A"); drilling fluid is pumped down the inner portion of the drill string 50 (as denoted by the arrow "B"). The drilling fluid exits the drill string 50 at the bit 52 and will then travel towards the drill string annulus 54, as seen, by the arrow "C". The gas/air and the drilling fluid will then mix within the drill string annulus 54 at the injection ports, namely ports 10, 16 and 20.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a review thereof.

I claim:

1. A method of drilling a well within a well bore with an under-balanced hydrostatic head of pressure, said well bore having a casing string therein, the method comprising:
    a) running into the well bore with a flow apparatus, said flow apparatus comprising: a tubular concentrically placed within the casing string, said tubular having a first injection port; a compression member disposed about an outer portion of said tubular, said compression member having extending therefrom an internal sliding mandrel, and wherein said internal sliding mandrel contains a second injection port; an external sliding sleeve operatively associated with said internal sliding mandrel, wherein said external sliding sleeve contains a third injection port; wherein in a closed position said first port, second port and said third port are misaligned and in an open position said first port, said second port and said third port are aligned; a compressible seal disposed about said external sliding sleeve and in contact with said internal sliding mandrel, said compressible seal responsive to longitudinal setting of weight on said compression member;

b) setting down weight on said tubular;
c) transferring the weight to said external sliding sleeve;
d) moving said compression member relative to said external sliding sleeve;
e) aligning said first port, said second port and said third port so that a passage is formed from an outer portion of said flow apparatus to an inner portion of said tubular;
f) expanding said compressible seal within a well bore annulus, said well bore annulus being formed between said well bore and said tubular;
g) lowering a drill string within said inner portion of said tubular, said drill string having a bit attached at a distal end;
h) forming a tubular annulus between said inner portion of said tubular and said drill string;
i) pumping a gas down said well bore annulus;
j) directing the gas through the passage and into said tubular annulus;
k) pumping fluid down an inner portion of the drill string;
l) mixing the fluid and the gas within the tubular annulus;
m) drilling the well with the bit;
n) lightening the hydrostatic head of pressure at the bit with the gas and the fluid mixture within the tubular annulus.

2. The method of claim 1 wherein the step of expanding the compressible seal includes setting down weight on said tubular so that said internal sliding mandrel acts against said seal member.

3. The method of claim 1 wherein the gas pumped down the well bore annulus is nitrogen.

4. The method of claim 1 wherein the step of expanding said compressible seal includes engaging the well bore with the compressible seal so that the gas being pumped down said tubular annulus is directed through said aligned ports.

* * * * *